H. F. CRAWFORD.
COMPOSITE OUTER SOLE.
APPLICATION FILED APR. 16, 1914.
1,123,698.
Patented Jan. 5, 1915.
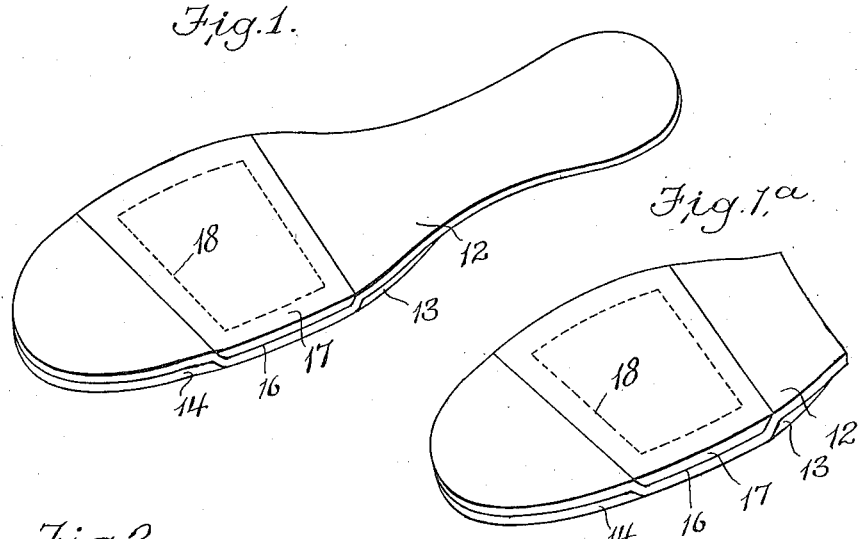
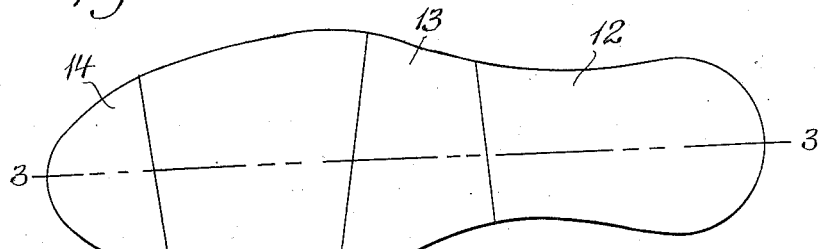
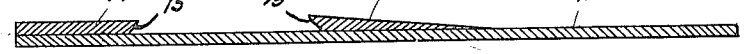
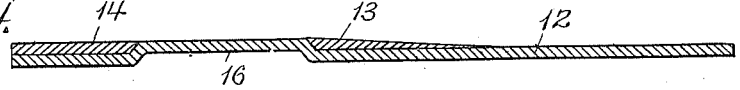
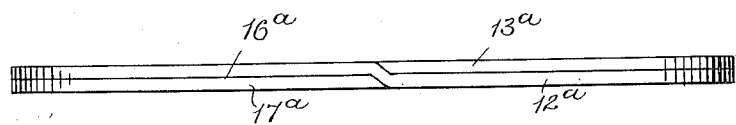
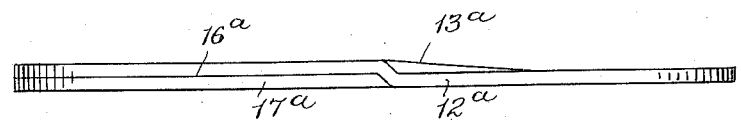
Witnesses:
Inventor:
H. F. Crawford
by Wright Brown Quinby May
Atty's.

UNITED STATES PATENT OFFICE.

HARVEY F. CRAWFORD, OF BROCKTON, MASSACHUSETTS, ASSIGNOR TO C. & S. RUBBER SOLE COMPANY, OF BROCKTON, MASSACHUSETTS, A CORPORATION OF MASSACHUSETTS.

COMPOSITE OUTER SOLE.

1,123,698.   Specification of Letters Patent.   Patented Jan. 5, 1915.

Application filed April 16, 1914. Serial No. 832,210.

*To all whom it may concern:*

Be it known that I, HARVEY F. CRAWFORD, a citizen of the United States, and resident of Brockton, in the county of Plymouth and State of Massachusetts, have invented certain new and useful Improvements in Composite Outer Soles, of which the following is a specification.

This invention relates to a composite outer sole having a body portion which is attachable by stitches or other fastenings to a shoe, and a tread portion made in a separate piece.

The invention has for its object to provide a suitably thick composite outer sole composed of relatively thin and inexpensive pieces or layers, the tread portion being preferably made of rubber, so that the strength and durability of leather and the elasticity of rubber are utilized.

The invention consists in the improvements which I will now proceed to describe and claim.

Of the accompanying drawings forming a part of this specification: Figure 1 represents a perspective view of a composite sole embodying my invention; Fig. 1ª represents a modification; Fig. 2 represents a side view of the parts hereinafter termed the body layer and the reinforcing layers as first assembled; Fig. 3 represents a section on lines 3—3 of Fig. 2; Fig. 4 represents a view similar to Fig. 3, showing a portion of the body layer offset, as indicated by Fig. 1; Figs. 5 and 6 represent edge views of an offset sole showing modifications hereinafter referred to.

The same reference characters indicate the same or similar parts in all of the views.

Referring for the present to Figs. 1, 2, 3 and 4, 12 represents a body layer composed of a single piece of leather. 13 and 14 represent reinforcing layers of considerably smaller area than the body layer 12, the area of the layers 13 and 14 being such that they may be readily made from relatively small leather pieces or scraps. The reinforcing layers are cemented or otherwise secured to the body layer and are spaced apart, their adjacent ends being preferably beveled, as shown at 15 (Fig. 3. The body layer is offset between the reinforcing layers 13 and 14 to form a recess 16 in the under side of the body layer, one side of the offset portion being substantially flush with the outer surfaces of the reinforcing layers.

17 represents a tread piece which fills the recess 16 and extends from edge to edge of the sole. Said tread piece is attached in any suitable way to the offset portion of the body layer, preferably by stitches 18, as shown by Fig. 1. The outer side of the tread piece 17 and the adjacent outer side portions of the body layer constitute the tread face of the sole. The upper side of the offset portion of the body layer and the upper sides of the reinforcing layers 13 and 14 constitute the seating surface of the sole. By the term seating surface I mean the surface which bears upon the other parts of the shoe in which the sole is incorporated, the upper side of the said offset portion constituting a considerable part of said seating surface, while the upper sides of the reinforcing layers constitute extensions of said surface. The tread piece 17 is preferably elastic and composed of the so-called rubber of which elastic soles and heels are usually made, although when elasticity is not desired the tread piece may be made of leather or like material.

The members of the above described composite sole may be made relatively thin, said members being so combined that they constitute a sole of substantial thickness. Owing to the fact that relatively thin pieces of leather may be used for the body layer 12 and tread piece 17, and pieces of relatively small area for the reinforcing layers 13 and 14, the cost of a sole of substantial thickness made as described is reduced to the minimum.

The sole may be secured to the parts comprising the bottom of a shoe in any suitable way. I have here shown the reinforcing layer 13 extended only to the shank portion of the sole and scarfed so that one end is much thinner than the other. It is obvious however that the layer 13 may be of uniform thickness from end to end and may extend to the heel end of the sole, when the latter includes a heel portion, as shown by Figs. 1 and 2. It is also obvious that the heel part of the sole may be omitted, as shown by Fig. 1ª, representing a forepart sole, which may be otherwise called a tap.

The reinforcing layer 14 may be omitted, as indicated by Figs. 5 and 6, in which 12ª represents the body layer, the offset portion of which extends to the toe end and forms an elongated recess 16ª, 17ª representing the tread piece, which is correspondingly extended. 13ª represents a reinforcing layer corresponding to the layer 13 above described, said layer either extending to the heel end of the sole, as shown by Fig. 5, or to the shank portion only, as shown by Fig. 6.

The word leather used herein may be considered as covering any relatively strong wear-resisting material analogous to leather. The word rubber may be considered as covering any material or composition analogous to that used in the manufacture of so-called rubber heels and soles.

Having described my invention, I claim:

1. A composite outer sole comprising a relatively thin body layer a portion of which is offset to form a recess and a seat portion extending entirely across the layer, a tread piece filling and secured in said recess, the offset portion and tread piece forming a sole portion of greater thickness than the body layer, and a reinforcing layer of smaller area than the body layer forming an extension of the said seat portion.

2. A composite outer sole comprising a relatively thin body layer a portion of which is offset to form a recess and a seat portion extending entirely across the layer, a tread piece filling and secured in said recess, the offset portion and tread piece forming a sole portion of greater thickness than the body layer, and two spaced-apart reinforcing layers at opposite ends of said recess, each of smaller area than the body layer and each forming an extension of said seat portion.

In testimony whereof I have affixed my signature, in presence of two witnesses.

HARVEY F. CRAWFORD.

Witnesses:
MARGARET M. MURPHY,
RICHARD W. NUTTER.